(12) United States Patent
Kyuma

(10) Patent No.: US 8,149,291 B2
(45) Date of Patent: Apr. 3, 2012

(54) IMAGE CAPTURE APPARATUS, CONTROL METHOD THEREOF, PROGRAM, AND STORAGE MEDIUM

(75) Inventor: Kenji Kyuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 11/124,050

(22) Filed: May 6, 2005

(65) Prior Publication Data

US 2005/0259176 A1     Nov. 24, 2005

(30) Foreign Application Priority Data

May 21, 2004 (JP) .................................. 2004-151983
Jun. 30, 2004 (JP) .................................. 2004-194286

(51) Int. Cl.
*H04N 9/73* (2006.01)

(52) U.S. Cl. .................................. 348/223.1; 348/228.1

(58) Field of Classification Search ..... 348/223.1–229.1
See application file for complete search history.

(56) References Cited

U.S. PATENT DOCUMENTS

| 5,526,088 | A | * | 6/1996 | Kusaka ........................... 396/96 |
| 5,568,194 | A | | 10/1996 | Abe |
| 5,617,139 | A | * | 4/1997 | Okino ......................... 348/223.1 |
| 6,750,911 | B1 | * | 6/2004 | Kobayashi et al. ........... 348/273 |
| 7,330,206 | B2 | * | 2/2008 | Nishimura ................. 348/223.1 |
| 2002/0018129 | A1 | * | 2/2002 | Ikeda ............................. 348/223 |
| 2003/0146983 | A1 | * | 8/2003 | Hoshuyama ............... 348/223.1 |

FOREIGN PATENT DOCUMENTS

| JP | 63-279124 | A | | 11/1988 |
| JP | 07107507 | A | * | 4/1995 |
| JP | 08-051632 | | | 2/1996 |
| JP | 2000-253409 | A | | 9/2000 |

* cited by examiner

*Primary Examiner* — Anthony J Daniels
(74) *Attorney, Agent, or Firm* — Canon USA Inc. IP Division

(57) ABSTRACT

An image capture apparatus sets an amount of exposure on an image sensor based on luminance information on an object field, calculates an expected signal level value that is an expected value of luminance signal level that is expected to be output from the image sensor when the image sensor is exposed at the set amount of exposure, compares the expected signal level value with an actual signal level value that is an actual value of luminance signal level output from the image sensor when the image sensor is exposed at the set amount of exposure, and sets a gain based on a result of the comparison.

8 Claims, 6 Drawing Sheets

FIG.2

| PD11 | PD12 | PD13 | PD14 | PD15 | PD16 | PD17 |
|------|------|------|------|------|------|------|
| PD21 | PD22 | PD23 | PD24 | PD25 | PD26 | PD27 |
| PD31 | PD32 | PD33 | PD34 | PD35 | PD36 | PD37 |
| PD41 | PD42 | PD43 | PD44 | PD45 | PD46 | PD47 |
| PD51 | PD52 | PD53 | PD54 | PD55 | PD56 | PD57 |

| E11 | E12 | E13 | E14 | E15 | E16 | E17 |
|-----|-----|-----|-----|-----|-----|-----|
| E21 | E22 | E23 | E24 | E25 | E26 | E27 |
| E31 | E32 | E33 | E34 | E35 | E36 | E37 |
| E41 | E42 | E43 | E44 | E45 | E46 | E47 |
| E51 | E52 | E53 | E54 | E55 | E56 | E57 |

16

IMAGE CAPTURE APPARATUS, CONTROL METHOD THEREOF, PROGRAM, AND STORAGE MEDIUM

BACKGROUND OF THE INVENTION

1. Field of the Invention

The present invention relates to gain control techniques for images in an image capture apparatus, such as a camera, that is capable of capturing still images or moving images.

2. Description of the Related Art

Japanese Laid-Open Patent Application No. 63-279124 discloses a light metering apparatus (exposure control apparatus) for use with an image capture apparatus such as a digital camera. In the light metering apparatus, an image capture plane is divided into a plurality of areas. The light metering apparatus obtains luminance information on every area and calculates a correct exposure value based on the obtained luminance information using a predetermined algorithm. Then, on the basis of the calculated exposure value, the image capture apparatus controls a gain to be applied to a captured image signal.

Japanese Laid-Open Patent Application No. 2000-253409 discloses an image capture apparatus, such as a digital camera, having an apparatus capable of providing an appropriate gain control. The image capture apparatus measures reflected light from an imaging plane so as to detect whether an external flash unit suitable for camera studios has been used for flash emission and, on the basis of a result of the detection, determines whether the external flash unit has been used. Then, taking a result of the determination into consideration, the image capture apparatus controls a gain to be applied to an image signal using a predetermined algorithm so as to perform adequate white balance correction.

In general, in single-lens reflex cameras, a light metering sensor is incorporated into a viewfinder optical system having a pentagonal prism. The light metering sensor is often configured to receive part of light rays diffused by a diffusion plate known as a focusing screen. In such a configuration, the light metering sensor is located at a position away from an optical axis of the viewfinder optical system, which is directed to an eyepiece lens. Accordingly, the amount of light incident on the light metering sensor varies in various ways depending on the speed (f-number) of an interchangeable lens, the position of an exit pupil thereof, or the diffusion characteristic of a focusing screen. Therefore, in cases where luminance information is to be obtained from a plurality of areas into which an image capture plane is divided, there is a possibility that the balance of the amount of light between a central portion of the image capture plane and a peripheral portion thereof may change. Accordingly, it may be difficult for the camera to determine whether a scene to be photographed is in a backlight condition or the like, and the actual exposure value may deviate from a correct exposure value. Correcting an output signal from the light metering sensor may be useful for preventing such problems. However, it is practically difficult to perform accurate correction for every interchangeable lens.

In cases where a large flash unit that is usually installed in a camera studio is used, only a modeling light is usually used to illuminate an object before starting exposure. The modeling light is an auxiliary light source that allows the photographer to preview the effects of flash emission. In this condition, when the photographer presses the shutter release button, the digital camera sends to the large flash unit a synchronization signal indicative of the duration in which the shutter is opened. The large flash unit emits flash light in synchronization with the synchronization signal, thus enabling an exposure operation to be performed. In the case of such an exposure operation, it is difficult for the digital camera to determine whether the large flash unit has really emitted flash light, on the basis of only the fact that the digital camera has sent the synchronization signal. Therefore, the digital camera uses, as auxiliary information for an automatic white balance correction method, information indicating that the object and the surrounding area are dark. The digital camera is uncertain whether flash emission has really taken place. Accordingly, the digital camera has to consider a wide range of color temperature as illumination light. Thus, it is often difficult to appropriately perform white balance adjustment depending on the color of an object.

SUMMARY OF THE INVENTION

The present invention has been made in consideration of the above situation. As such, an aspect of the present invention is to provide an image capture apparatus, such as a camera, capable of capturing an image subjected to adequate correction while eliminating the influence of an error caused by characteristics of an individual lens unit attached to the image capture apparatus, an error caused by characteristics of an individual optical member incorporated in the image capture apparatus, or an error caused by sensitivity characteristics of an image sensor.

In one aspect of the present invention, an image capture apparatus includes an image capture unit that photoelectrically converts an image of an object field formed by an image capture optical system, an amount-of-exposure setting unit that sets an amount of exposure on the image capture unit based on luminance information on the object field, an expected-value calculating unit that calculates an expected signal level value that is an expected value of luminance signal level that is expected to be output from the image capture unit when the image capture unit is exposed at the amount of exposure set by the amount-of-exposure setting unit, and a gain control unit that compares the expected signal level value with an actual signal level value that is an actual value of luminance signal level that is actually output from the image capture unit when the image capture unit is exposed at the amount of exposure set by the amount-of-exposure setting unit, and that sets a gain based on a result of the comparison.

In another aspect of the present invention, an image capture apparatus includes an image capture unit that photoelectrically converts an image of an object field formed by an image capture optical system, an amount-of-exposure setting unit that sets an amount of exposure on the image capture unit based on luminance information on the object field, an expected-value calculating unit that calculates an expected signal level value that is an expected value of luminance signal level that is expected to be output from the image capture unit when the image capture unit is exposed at the amount of exposure set by the amount-of-exposure setting unit, and a control-value setting unit that sets a white balance control value based on a difference in magnitude between the expected signal level value and an actual signal level value that is an actual value of luminance signal level that is actually output from the image capture unit when the image capture unit is exposed at the amount of exposure set by the amount-of-exposure setting unit.

In still another aspect of the present invention, a control method for an image capture apparatus having an image sensor that photoelectrically converts an image of an object field formed by an image capture optical system includes an amount-of-exposure setting step of setting an amount of exposure on the image sensor based on luminance information on the object field, an expected-value calculating step of calculating an expected signal level value that is an expected value of luminance signal level that is expected to be output from the image sensor when the image sensor is exposed at the amount of exposure set by the amount-of-exposure setting step, and a gain control step of comparing the expected signal level value with an actual signal level value that is an actual value of luminance signal level that is actually output from the image sensor when the image sensor is exposed at the amount of exposure set by the amount-of-exposure setting step, and of setting a gain based on a result of the comparison.

In still yet another aspect of the present invention, a control method for an image capture apparatus having an image sensor that photoelectrically converts an image of an object field formed by an image capture optical system includes an amount-of-exposure setting step of setting an amount of exposure on the image sensor based on luminance information on the object field, an expected-value calculating step of calculating an expected signal level value that is an expected value of luminance signal level that is expected to be output from the image sensor when the image sensor is exposed at the amount of exposure set by the amount-of-exposure setting step, and a control-value setting step of setting a white balance control value based on a difference in magnitude between the expected signal level value and an actual signal level value that is an actual value of luminance signal level that is actually output from the image sensor when the image sensor is exposed at the amount of exposure set by the amount-of-exposure setting step.

In yet another aspect of the present invention, a program causes a computer to perform the above-described control method.

In another aspect of the present invention, a control apparatus for an image capture apparatus having an image sensor that photoelectrically converts an image of an object field formed by an image capture optical system includes a microcomputer. The microcomputer sets an amount of exposure on the image sensor based on luminance information on the object field, calculates an expected signal level value that is an expected value of luminance signal level that is expected to be output from the image sensor when the image sensor is exposed at the set amount of exposure, compares the expected signal level value with an actual signal level value that is an actual value of luminance signal level that is actually output from the image sensor when the image sensor is exposed at the set amount of exposure, and sets a gain based on a result of the comparison.

In still another aspect of the present invention, a control apparatus for an image capture apparatus having an image sensor that photoelectrically converts an image of an object field formed by an image capture optical system includes a microcomputer. The microcomputer sets an amount of exposure on the image sensor based on luminance information on the object field, calculates an expected signal level value that is an expected value of luminance signal level that is expected to be output from the image sensor when the image sensor is exposed at the set amount of exposure, and sets a white balance control value based on a difference in magnitude between the expected signal level value and an actual signal level value that is an actual value of luminance signal level that is actually output from the image sensor when the image sensor is exposed at the set amount of exposure.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram illustrating light metering areas of a light metering sensor according to the first embodiment.

FIG. 3 is a diagram showing the arrangement of pixels of an image sensor according to the first embodiment.

FIG. 4 is a diagram illustrating light metering areas in the image sensor according to the first embodiment.

DETAILED DESCRIPTION OF THE EMBODIMENTS

Embodiments of the invention will be described in detail below with reference to the drawings.

First Embodiment

Figure 1:
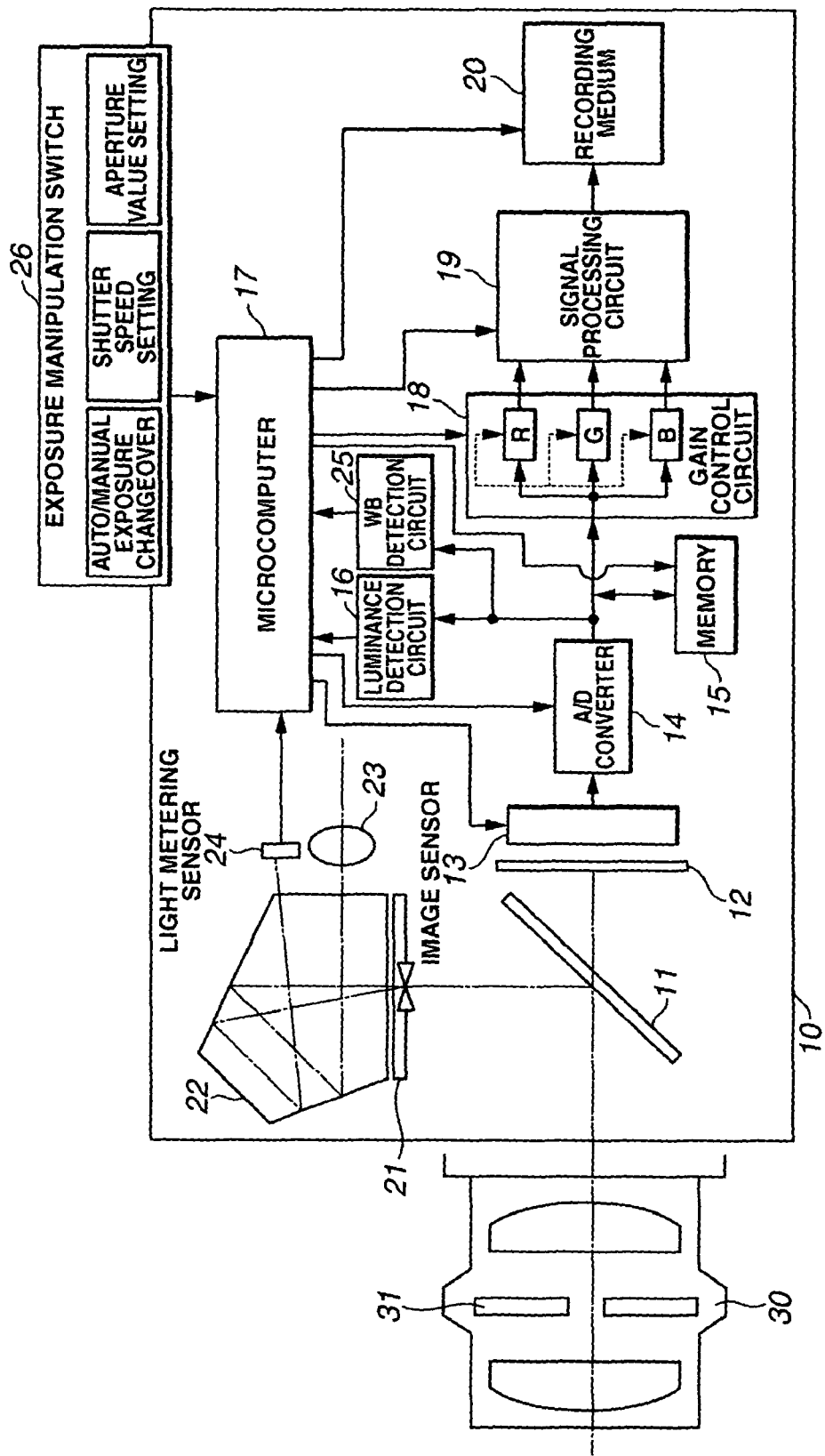
FIG. 1 is a block diagram schematically illustrating the configuration of a single-lens reflex camera according to a first embodiment of the invention, on which a plurality of types of interchangeable lenses is selectively mounted.

FIG. 1 is a block diagram schematically illustrating the configuration of a single-lens reflex camera according to a first embodiment of the invention, on which a plurality of types of interchangeable lenses is selectively mounted.

Referring to FIG. 1, the camera includes a camera body 10 and an interchangeable lens 30. The interchangeable lens 30 is detachably mounted on the camera body 10. The camera body 10 and the interchangeable lens 30 are electrically coupled with each other via contacts (not shown). The interchangeable lens 30 includes at least a diaphragm 31.

The camera body 10 includes a mirror 11, a shutter 12 and an image sensor 13. The image sensor 13 is a solid-state image sensor such as a CCD (charge-coupled device) sensor. The mirror 11 is configured to flip upward so as to allow light passing through the interchangeable lens 30 to reach the image sensor 13 during an image capture operation. The image sensor 13 is not limited to a CCD sensor but may be another solid-state image sensor having a photoelectric conversion function, such as a CMOS (complementary metal-oxide semiconductor) sensor. The shutter 12 is, for example, a mechanical shutter having movable blade members. Alternatively, the shutter 12 may be an electronic shutter which is configured to control exposure time by controlling the timing of switching of the image sensor 13. The camera further includes a focusing screen 21, a pentagonal prism 22, en eyepiece lens 23, a light metering sensor 24, a microcomputer 17 and an exposure manipulation switch 26. The focusing screen 21 has a diffusion function. The eyepiece lens 23 is disposed to allow the user to view an object to be photographed. The light metering sensor 24 acquires information on the luminance of an object. The microcomputer 17 receives an output signal from the light metering sensor 24. The exposure manipulation switch 26 is operable by the user to change exposure modes including an automatic exposure mode, a manual exposure mode, etc., and to set the shutter speed and the aperture value.

The microcomputer 17 not only receives an output signal from the light metering sensor 24 but also controls the operation of every part of the camera body 10.

The light metering sensor 24 is composed of photoelectric conversion elements, such as silicon photodiodes, and has a light receiving sensor portion that is divided into a plurality of areas in a lattice pattern as shown in FIG. 2. The light receiving sensor portion corresponds to approximately the entire area of an image capture plane of the image sensor 13.

As shown in FIG. 2, the light receiving sensor portion of the light metering sensor 24 is divided into 7 columns and 5 rows, i.e., 35 light sensitive sections PD11 to PD17, PD21 to PD27, PD31 to PD37, PD41 to PD47, and PD51 to PD57. The light metering sensor 24 is configured as an integrated circuit in which a signal amplifier portion, a signal processing peripheral circuit, etc., are formed on the same tip together with the light receiving sensor portion.

The focusing screen 21, the pentagonal prism 22 and the eyepiece lens 23 constitute a viewfinder optical system. The light metering sensor 24 is disposed to receive part of light rays other than light rays reaching the eyepiece lens 23 among light rays reflected by the mirror 11 and then diffused by the focusing screen 21. Light rays to be incident on the light metering sensor 24 are influenced by the speed (f-number) of the interchangeable lens 30, the position of an exit pupil thereof, and the diffusion characteristic of the focusing screen 21. Therefore, an output signal from the light metering sensor 24 contains errors that are dependent on these influences.

The camera further includes an A/D converter 14, a memory 15, a gain control circuit 18, a signal processing circuit 19, a recording medium 20, a luminance detection circuit 16 and a WB (white balance) detection circuit 25. The A/D converter 14 converts an analog signal from the image sensor 13 into a digital signal. The digital signal from the A/D converter 14 is written into and then read out from the memory 15. The gain control circuit 18 applies a gain to a signal read out from the memory 15 and also performs white balance (WB) correction on the signal. The signal processing circuit 19 applies predetermined processing to a signal output from the gain control circuit 18 to form an image signal. The recording medium 20 is provided to record a signal output from the signal processing circuit 19. The luminance detection circuit 16 is arranged to receive a digital signal output from the A/D converter 14. The WB detection circuit 25 detects color signals to be subjected to white balance correction.

More specifically, the signal processing circuit 19 processes a signal received from the gain control circuit 18 in a predetermined format to form an image signal that is to be recorded on the recording medium 20. The signal processing circuit 19 includes a gamma compression circuit, a color signal processing circuit, a luminance signal processing circuit, etc.

The gain control circuit 18 applies a gain to an image signal so as to correct for an overexposure or underexposure portion of the amount of exposure controlled by the diaphragm 31 and the shutter 12. Thus, the gain control circuit 18 performs gain control with respect to an image signal that is linearly proportional to the amount of exposure.

Accordingly, in cases where, in order to correct for an overexposure or underexposure portion of the amount of exposure, gain control is performed with respect to an image signal that has passed through a gamma compression circuit for nonlinear transform included in the signal processing circuit 19, the gain control circuit 18 cannot be constructed with only a simple multiplication circuit. Moreover, in that case, correction to a compressed signal tends to generate quantization errors. Therefore, in the case of the first embodiment of the invention, an image signal is subjected to gain control before being supplied to the signal processing circuit 19.

The image sensor 13 has R (red), G (green) and B (blue) color filters arrayed in a checkered pattern as shown in FIG. 3. The image sensor 13 performs photoelectric conversion at each pixel exposed to light. Signals generated by photoelectric conversion are sequentially read out from the image sensor 13 at predetermined timing. The A/D converter 14 converts the signals from the image sensor 13 into a digital signal. The digital signal is written into the memory 15 and is also supplied to the luminance detection circuit 16. The luminance detection circuit 16 divides an image signal obtained at the image sensor 13 into 7 columns and 5 rows, i.e., 35 areas E11 to E17, E21 to E27, E31 to E37, E41 to E47, and E51 to E57 as shown in FIG. 4, and detects a luminance signal at each area. The areas E11 to E57 in the image sensor 13 and the light sensitive sections PD11 to PD57 of the light metering sensor 24 are respectively configured to receive light from approximately the same portion with respect to an object field.

A luminance signal (Y) can be detected, for example, by using the following equation (1), in which all of the color pixel outputs in each area are added together.

$$Y=R+2G+B \quad (1)$$

The luminance signals detected by the luminance detection circuit 16 are sent to the microcomputer 17.

The digital signal from the A/D converter 14 is written into the memory 15 and is also supplied to both the luminance detection circuit 16 and the WB detection circuit 25. The WB detection circuit 25 detects color signals for white balance correction from the digital signal and sends the detected information to the microcomputer 17.

Figure 5:
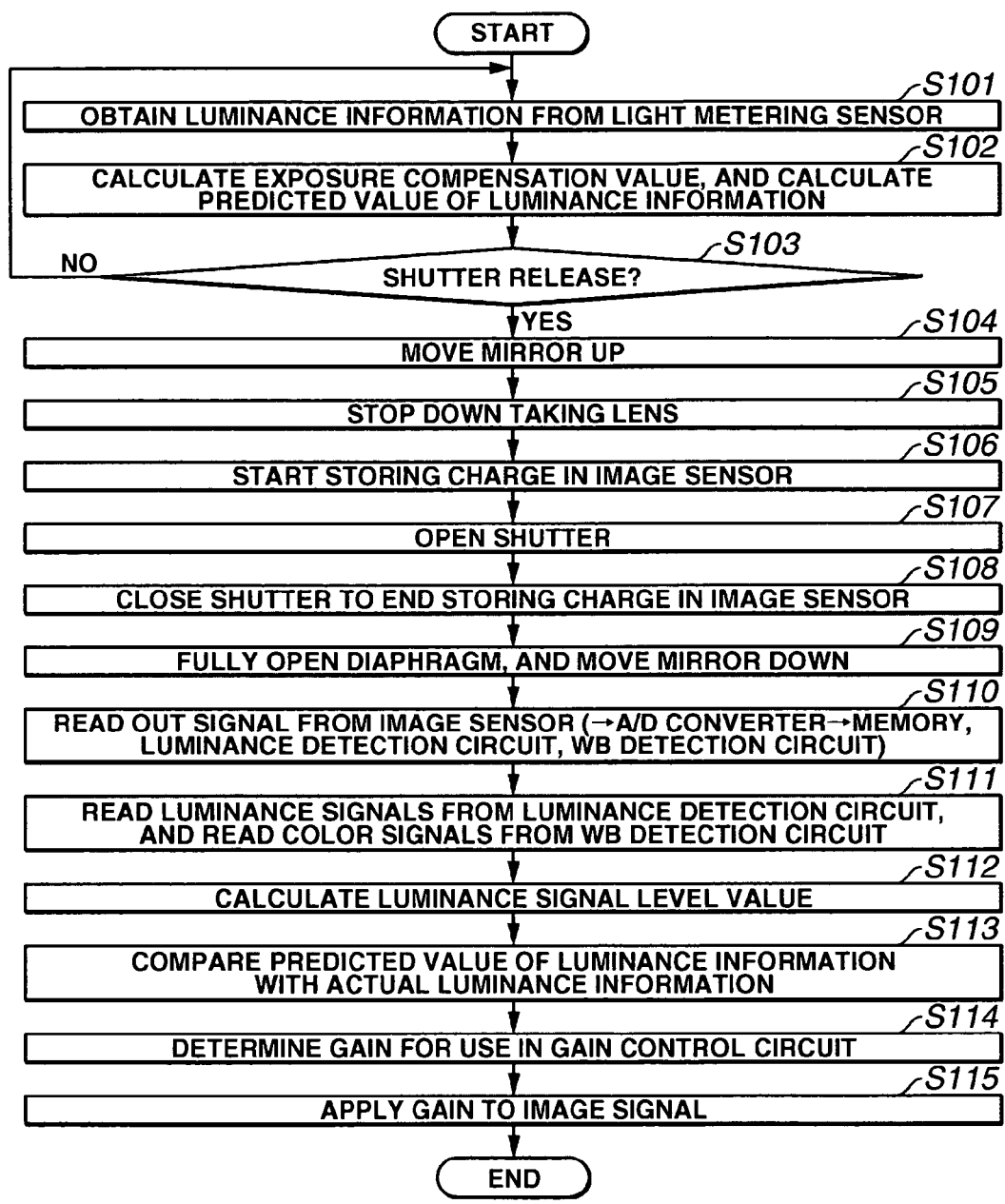
FIG. 5 is a flow chart illustrating an image capture sequence of the camera according to the first embodiment.

FIG. 5 is a flow chart illustrating an image capture sequence of the camera relating to a gain control operation controlled by the microcomputer 17 according to the first embodiment.

When a power switch (not shown) of the camera is turned on, the camera body 10 and the interchangeable lens 30 become operative. When the first-stroke switch of a shutter release button (not shown) of the camera is turned on (the shutter release button is pressed halfway), step S101 shown in FIG. 5 is started.

At step S101, the microcomputer 17 obtains luminance information on each portion of an image plane by reading out signals from 35 light sensitive sections PD11 to PD57 of the light metering sensor 24.

At step S102, the microcomputer 17 obtains necessary information on the interchangeable lens 30 via contacts (not shown) disposed between the camera body 10 and the interchangeable lens 30. Then, the microcomputer 17 performs luminance correction on each portion of the image plane and calculates the luminance of the entire image plane while weighting some of the 35 divided areas (light sensitive sections). In addition, the microcomputer 17 compares luminance information on the weighted divided areas with luminance information on the other, peripheral divided areas, thus determining whether a scene to be photographed is in a backlight condition. If the scene is determined to be in a backlight condition, the microcomputer 17 corrects the calculated luminance of the entire image plane by a predetermined amount. If the scene is in a condition where the luminance of the entire image plane is lower than a predetermined value, the microcomputer 17 defines a setting to use a flash unit (not shown) for flash emission. On the basis of the luminance information on the entire image plane calculated as described above and the sensitivity of the image sensor 13, the microcomputer 17 tentatively determines an exposure compensation value, such as an aperture value and a shutter speed, optimum for photography. At the same time, the microcomputer 17 calculates and stores a predicted value of luminance information as an expected signal level value which is expected to be obtained from the output of the image sensor 13 at the time of the actual shooting based on the tentatively determined exposure compensation value and another condition such as the presence or absence of flash emission by the flash unit.

Moreover, at step S102, if the camera is in the manual exposure mode to allow the photographer to freely select the aperture value and shutter speed by operating the exposure manipulation switch 26, the microcomputer 17 tentatively regards the aperture value and shutter speed selected by the photographer as an exposure compensation value. Even in this case, the microcomputer 17 calculates and stores a predicted value of luminance information as an expected signal level value which is expected to be obtained from the output of the image sensor 13 at the time of the actual shooting based on the tentatively determined exposure compensation value and another condition such as the presence or absence of flash emission by the flash unit.

At step S103, the microcomputer 17 checks to determine if the second-stroke switch of the shutter release button is turned on (the shutter release button is pressed all the way). If the switch is not turned on, the microcomputer 17 returns to step S101. If the switch is turned on, the microcomputer 17 proceeds to step S104.

At step S104, the microcomputer 17 issues a command to cause the mirror 11 to flip upward.

At step S105, the microcomputer 17 outputs the aperture value information calculated at step S102 to the interchangeable lens 30. The interchangeable lens 30 stops down the aperture thereof to a predetermined aperture value by driving the diaphragm 31 based on the aperture value information received from the microcomputer 17.

At step S106, the image sensor 13 completes a preparation for exposure and starts storing electric charge.

At step S107, the microcomputer 17 issues a command to open the shutter 12. The shutter 12 then opens to allow light rays passing thorough the interchangeable lens 30 to fall on the image sensor 13, thus starting an image capture operation.

At step S108, the microcomputer 17 issues a command to close the shutter 12 after the elapse of a time corresponding to the shutter speed calculated at step S102. Then, the shutter 12 closes to stop light rays from falling on the image sensor 13, thus substantially ending storing electric charge. Here, the stored electric charge is under the influence of an error caused by the characteristics of the individual interchangeable lens 30 or an error caused by the characteristics of an individual optical member disposed in the camera body 10.

At step S109, the microcomputer 17 issues a command to fully open the diaphragm 31 and to flip back down the mirror 11.

At step S110, the microcomputer 17 issues a command to read out a signal from the image sensor 13. The signal read out from the image sensor 13 passes through the A/D converter 14 and is then written into the memory 15, as described above. The signal output from the A/D converter 14 is also supplied to the luminance detection circuit 16 and the WB detection circuit 25.

At step S111, the microcomputer 17 reads luminance signals of the respective areas E11 to E57 detected by the luminance detection circuit 16 and color signals detected by the WB detection circuit 25.

At step S112, the microcomputer 17 calculates luminance information on the entire image plane as a luminance signal level value from values weighted similar to step S102 of the luminance signals of the respective areas E11 to E57 that have actually been obtained from the signal from the image sensor 13 during the image capture operation.

At step S113, the microcomputer 17 compares the predicted value of luminance information as an expected signal level value calculated at step S102 with the luminance information calculated at step S112. A difference obtained by this comparison contains an error caused by the characteristics of the individual interchangeable lens 30 or an error caused by the characteristics of an individual optical member disposed in the camera body 10. While, in the first embodiment, the predicted value of luminance information calculated at step S102 is used as an expected signal level value for comparison, a target value predetermined as a correct amount of exposure on an object may be used as the expected signal level value.

At step S114, on the basis of the signals read from the luminance detection circuit 16 and the WB detection circuit 25 at step S111 and a result of the comparison made at step S113, the microcomputer 17 determines a control value to be applied to the gain control circuit 18 so as to perform an adequate gain control operation.

At step S115, the microcomputer 17 causes an image signal to be sequentially read out from the memory 15 and then to be supplied to the gain control circuit 18, in which the gain is set according to the control value determined at step S114. Accordingly, an error caused by the characteristics of the individual interchangeable lens 30 or an error caused by the characteristics of an individual optical member disposed in the camera body 10 is compensated for. After that, an output signal from the gain control circuit 18 is subjected to predetermined processing by the signal processing circuit 19 and is then recorded on the recording medium 20.

Thus, the image capture sequence of the camera ends.

As described above, according to the first embodiment, in an image capture operation in which an error caused by the characteristics of the individual interchangeable lens 30 or an error caused by the characteristics of an individual optical member disposed in the camera body 10 is contained, a value corresponding to such an error is detected from a captured image signal and the image signal is corrected according to the detected value, so that the above-described various errors can be eliminated.

Second Embodiment

Figure 6:
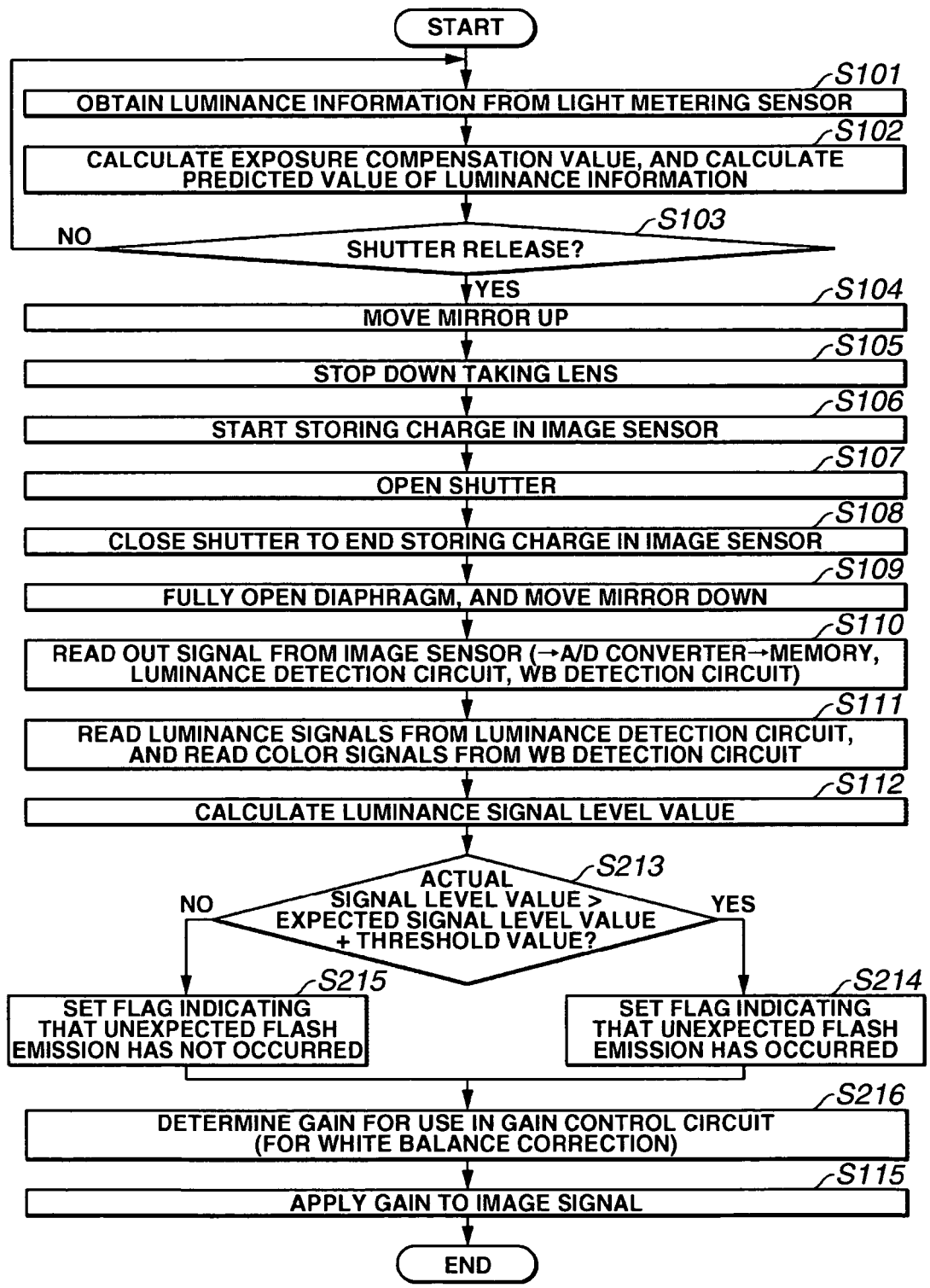
FIG. 6 is a flow chart illustrating an image capture sequence according to a second embodiment of the invention.

FIG. 6 is a flow chart illustrating the image capture sequence of a camera according to a second embodiment of the invention. In FIG. 6, steps for performing the same processing operations as those in the first embodiment are assigned the same step numbers as those in FIG. 5.

The second embodiment differs from the first embodiment in that, while the first embodiment is configured to correct luminance by controlling the gain, the second embodiment is configured to correct white balance by controlling the gain.

In the flow chart of FIG. 6, steps S113 and S114 shown in FIG. 5 are replaced by steps S213 to S216, which are discussed below.

At step S213, the microcomputer 17 makes a comparison to determine if the luminance signal level value calculated at step S112 is greater than a value obtained by adding a predetermined threshold value to the expected signal level value calculated or estimated at step S102. If the calculated luminance signal level value is greater, the microcomputer 17 proceeds to step S214. If the calculated luminance signal level value is less, the microcomputer 17 proceeds to step S215.

At step S214, the microcomputer 17 sets a flag indicating that an unexpected flash emission has occurred. Then, the microcomputer 17 proceeds to step S216.

At step S215, the microcomputer 17 sets a flag indicating that an unexpected flash emission has not occurred. Then, the microcomputer 17 proceeds to step S216.

At step S216, on the basis of the signals read from the WB detection circuit 25 at step S111 and the flag information set at step S214 or S215 indicating whether an unexpected flash emission has occurred, the microcomputer 17 determines a control value to be applied to the gain control circuit 18 so as to perform an appropriate white balance correction operation. For example, in cases where the predetermined threshold value for use at step S213 is set to about three times the expected signal level value, if the flag indicating that an unexpected flash emission has occurred is set, the percentage of flash light included in the light illuminating an object is considered to be at least 70% of the whole illumination light. In this case, the color temperature of flash light is dominant in the color temperature of illumination light. Therefore, a color temperature range only around the color temperature of flash light should be taken into account to finally estimate the color temperature of illumination light. If the flag indicating that an unexpected flash emission has not occurred is set at step S215, the microcomputer 17 takes into account a wide color temperature range from a low color temperature of an incandescent lamp to a high color temperature of a shaded area, as in the ordinary white balance correction operation, to determine a white balance control value.

More specifically, the gain control value for use in white balance correction is determined at step S216 as described below. First, the microcomputer 17 checks to determine if any one of R, G and B signals in each area obtained at the WB detection circuit 25 has an extremely large or small signal level. If so, the microcomputer 17 excludes a signal having an extremely large or small signal level from signals for use in calculation for white balance correction. Next, the microcomputer 17 adds together R, G and B signals respectively for each color in the remaining areas. Then, the microcomputer 17 compares a result of addition of G signals with each of respective results of addition of R and B signals and calculates the gain of each of R and B signals suitable for according with G signals. The microcomputer 17 limits the calculated gain of each of R and B signals to fall within the range of the gain of each of R and B signals corresponding to the expected value of luminance information used for the comparison made at step S213. Then, the microcomputer 17 applies to the gain control circuit 18 control values corresponding to the determined gain of each of R and B signals.

Third Embodiment

Figure 7:
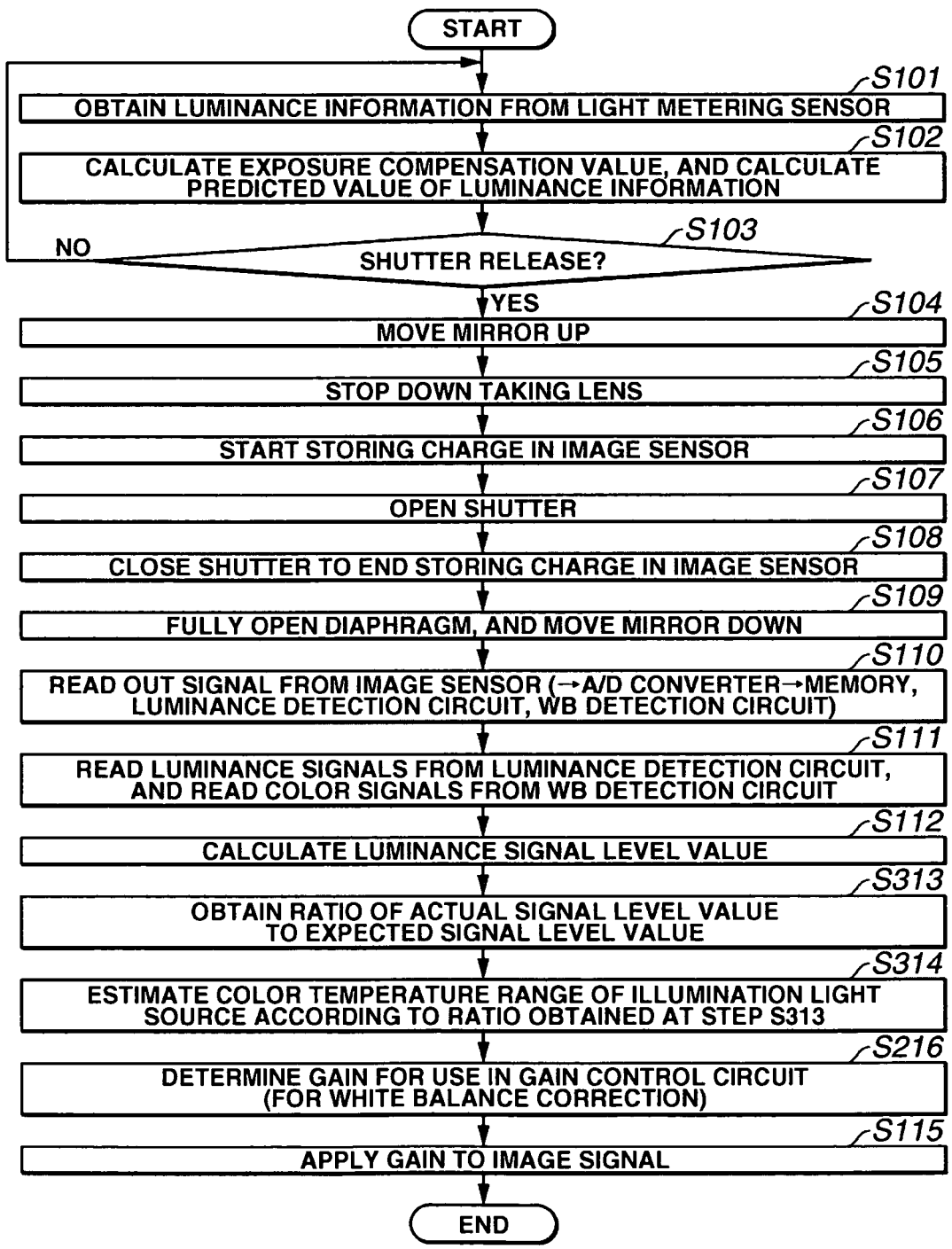
FIG. 7 is a flow chart illustrating an image capture sequence according to a third embodiment of the invention.

FIG. 7 is a flow chart illustrating the image capture sequence of a camera according to a third embodiment of the invention. In FIG. 7, steps for performing the same processing operations as those in the second embodiment are assigned the same step numbers as those in FIG. 6.

The third embodiment differs from the second embodiment in that, while the second embodiment is configured to correct white balance by controlling the gain in accordance with the magnitude relation between the actual signal level value and the expected signal level value, the third embodiment is configured to correct white balance by controlling the gain in accordance with the ratio of the actual signal level value to the expected signal level value.

In the flow chart of FIG. 7, steps S213, S214 and S215 shown in FIG. 6 are replaced by steps S313 and S314, which are discussed below.

At step S313, the microcomputer 17 obtains the ratio of the actual signal level value obtained from the image sensor 13 to the expected signal level value calculated or estimated at step S102. Then, the microcomputer 17 proceeds to step S314.

At step S314, the microcomputer 17 estimates the color temperature range of an illumination light source using at least the ratio obtained at step S313. For example, if the actual signal level value is ten times the expected signal level value, the microcomputer 17 determines that 90% of illumination light falling on an object is light from an unexpected light source. In such a case, it can be considered that the unexpected illumination light is likely to be light from a flash unit. Therefore, the microcomputer 17 can estimate that most of the illumination light falling on an object is flash light. Assuming that the color temperature range of light emission of a flash unit on the market is from about 5000 K (Kelvin) to about 6500 K, it can be estimated that the color temperature of illumination light falling on an object falls within a range obtained by slightly expanding the range of about 5000 K to about 6500 K.

In the above-described first, second or third embodiments, the method for obtaining a difference between the expected signal level value calculated before exposure and the actual signal level value obtained after exposure and the method for estimating the color temperature range are not limited to those described in each embodiment.

Furthermore, the method for determining the gain for use in the gain control circuit 18 may be changed to various methods, for example, a method in which the gain control or white balance correction is not performed if a result of comparison between the two level values indicates an amount of difference smaller than a given value.

Moreover, in the above-described first, second or third embodiment, on the basis of an output from the light metering sensor 24, the microcomputer 17 sets the amount of exposure on the image sensor 13 for use in the actual exposure operation. However, the microcomputer 17 may use an output from the image sensor 13 for that purpose without using the light metering sensor 24.

Each embodiment can also be achieved by providing a system or apparatus with a storage medium (or a recording medium) that stores a program code of software for implementing the functions of the above-described embodiments, and causing a computer (or a CPU, MPU or the like) of the system or apparatus to read the program code from the storage medium and then to execute the program code. In this case, the program code itself read from the storage medium implements the functions of the embodiments, and the storage medium storing the program code constitutes the invention. Furthermore, besides the program code read by the computer being executed to implement the functions of the above-described embodiments, the present invention includes an operating system (OS) or the like running on the computer performing an actual process in whole or in part according to instructions of the program code to implement the functions of the above-described embodiments.

Moreover, the present invention also includes a CPU or the like contained in a function expansion board inserted into the computer or in a function expansion unit connected to the computer, the function expansion board or the function expansion unit having a memory in which the program code read from the storage medium is written, the CPU or the like performing an actual process in whole or in part according to instructions of the program code to implement the functions of the above-described embodiments.

If the present invention is applied to the above storage medium, a program code corresponding to the above-described sequence is stored in the storage medium.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Applications No. 2004-151983 filed May 21, 2004 and No. 2004-194286 filed Jun. 30, 2004, which are hereby incorporated by reference herein.

What is claimed is:

1. An image capture apparatus comprising: an image capture unit photoelectrically converting an image of an object field formed by an image capture optical system; a light metering unit different from the image capture unit; an amount-of-exposure setting unit setting an amount of exposure on the image capture unit based on luminance information on the object field obtained by the light metering unit; a predicted-value calculating unit calculating a predicted signal level value that is a predicted value of a luminance signal level that is predicted to be output from the image capture unit when the image capture unit is exposed based on the amount of exposure set by the amount-of-exposure setting unit; and wherein the luminance signal is determined based on RGB signals and is different from a color signal; and a control-value setting unit setting a white balance control value based on the predicted signal level value and an actual signal level value that is an actual value of luminance signal level output from the image capture unit when the image capture unit is exposed based on the amount of exposure set by the amount-of-exposure setting unit, wherein, if the actual signal level value is larger than the predicted signal level value by a predetermined amount, the control-value setting unit sets the white balance control value according to a color temperature of the flash light, and wherein, if the actual signal level value is not larger than the predicted signal level value by the predetermined amount, the control-value setting unit sets the white balance control value according to a color temperature different from the color temperature of the flash light.

2. An image capture apparatus according to claim 1, wherein the predicted-value calculating unit calculates the predicted signal level value after the light metering unit obtains the luminance information on the object field.

3. An image capture apparatus according to claim 1, wherein the predicted-value calculating unit calculates the predicted signal level value before the image capture unit is exposed based on the amount of exposure set by the amount-of-exposure setting unit.

4. An image capture apparatus according to claim 1, wherein the predicted-value calculating unit calculates the predicted signal level value whenever the light metering unit obtains the luminance information on the object field.

5. An image capture apparatus according to claim 1, wherein, if the actual signal level value is not larger than the predicted signal level value by the predetermined amount, the control-value setting unit sets the white balance control value according to an ordinary white balance correction operation.

6. An image capture apparatus according to claim 1, wherein, if the actual signal level value is larger than the predicted signal level value by a predetermined amount, the control-value setting unit sets the white balance control value according to a color temperature of the flash light and does not change the white balance control value based on the difference in magnitude between the predicted signal level value and the actual signal level value.

7. A control method for an image capture apparatus having an image sensor that photoelectrically converts an image of an object field formed by an image capture optical system and a light metering unit different from the image capture unit, the control method comprising: an amount-of-exposure setting step of setting an amount of exposure on the image sensor based on luminance information on the object field obtained by the light metering unit; a predicted-value calculating step of calculating a predicted signal level value that is a predicted value of luminance signal level that is predicted to be output from the image sensor when the image sensor is exposed based on the amount of exposure set by the amount-of-exposure setting step; and wherein the luminance signal is determined based on RGB signals and is different from a color signal; a control-value setting step of setting a white balance control value based on the predicted signal level value and an actual signal level value that is an actual value of luminance signal level output from the image sensor when the image sensor is exposed based on the amount of exposure set by the amount-of-exposure setting step; wherein the predicted-value calculating unit calculates the predicted signal level value, based on the luminance information on the object field obtained by the light metering unit before the image capture unit is exposed based on the amount of exposure set by the amount-of-exposure setting unit; wherein, if the actual signal level value is larger than the predicted signal level value by a predetermined amount, the control-value setting unit sets the white balance control value according to a color temperature of the flash light, and wherein, if the actual signal level value is not larger than the predicted signal level value by the predetermined amount, the control-value setting unit sets the white balance control value according to a color temperature different from the color temperature of the flash light.

8. A computer-readable storage medium storing a computer-executable process, the computer-executable process causing a computer to implement the method according to claim 7.

* * * * *